Oct. 26, 1965  W. HEIER  3,213,777
BREWING APPARATUS
Filed May 31, 1963  5 Sheets-Sheet 1

INVENTOR.
William Heier
BY
Synnestvedt & Lechner
ATTORNEYS

Oct. 26, 1965   W. HEIER   3,213,777
BREWING APPARATUS
Filed May 31, 1963   5 Sheets-Sheet 2
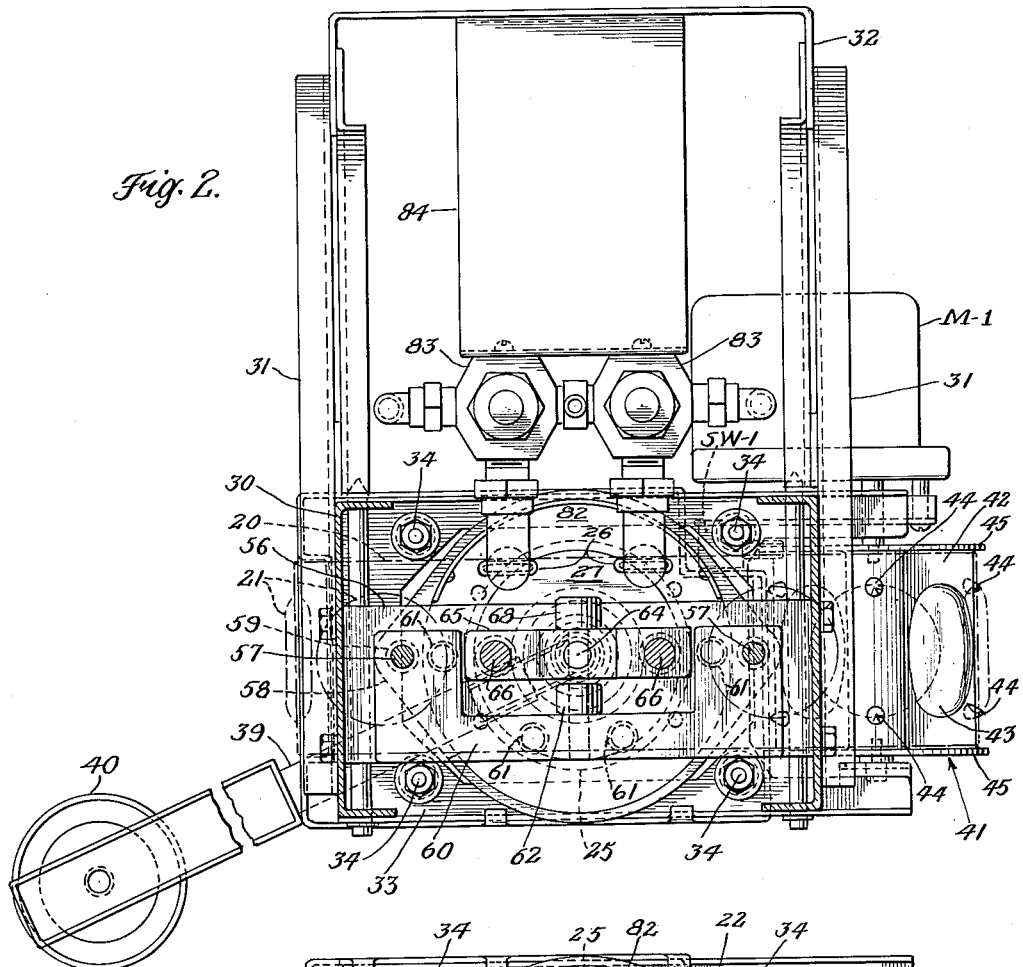
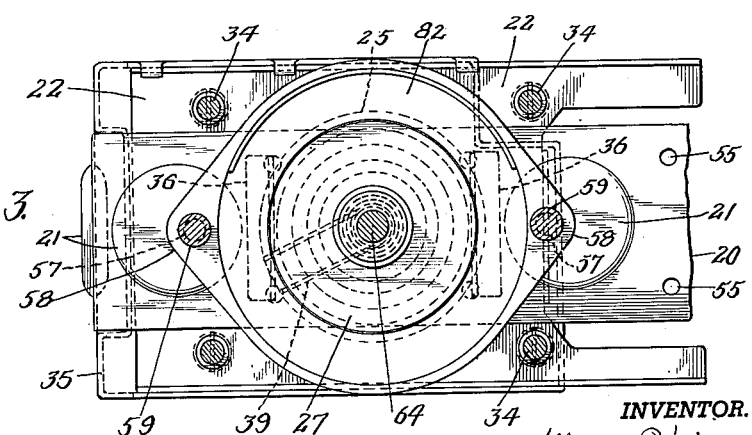
INVENTOR.
William Heier
BY
Synnestvedt & Lechner
ATTORNEYS

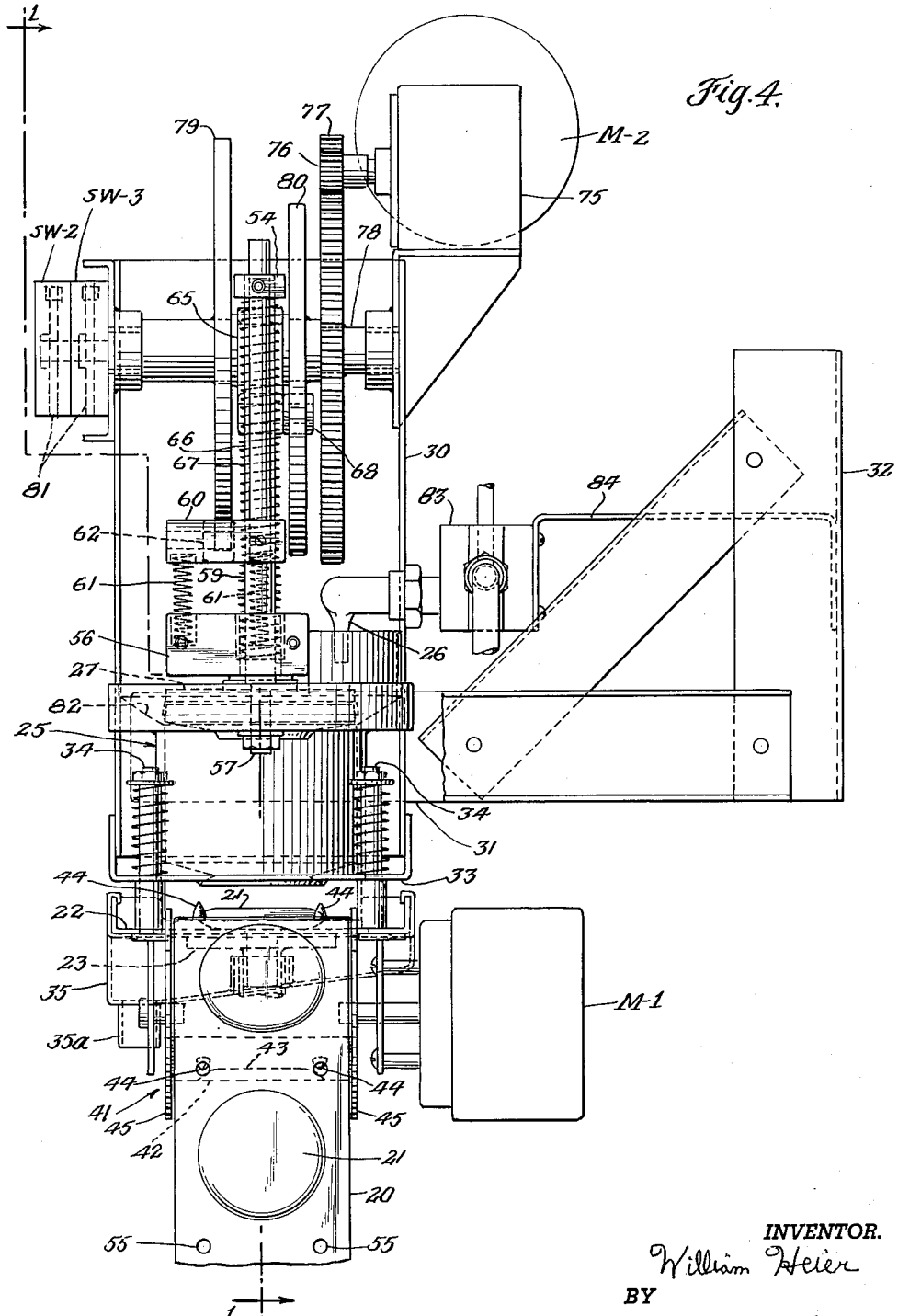

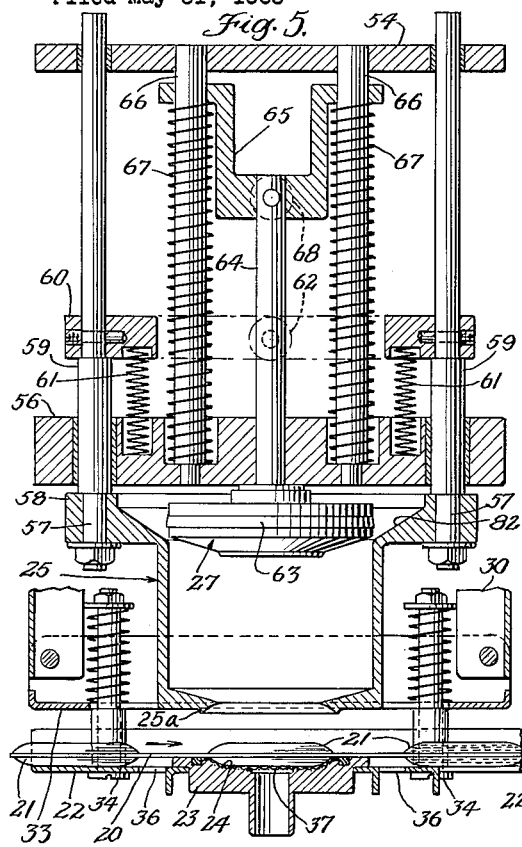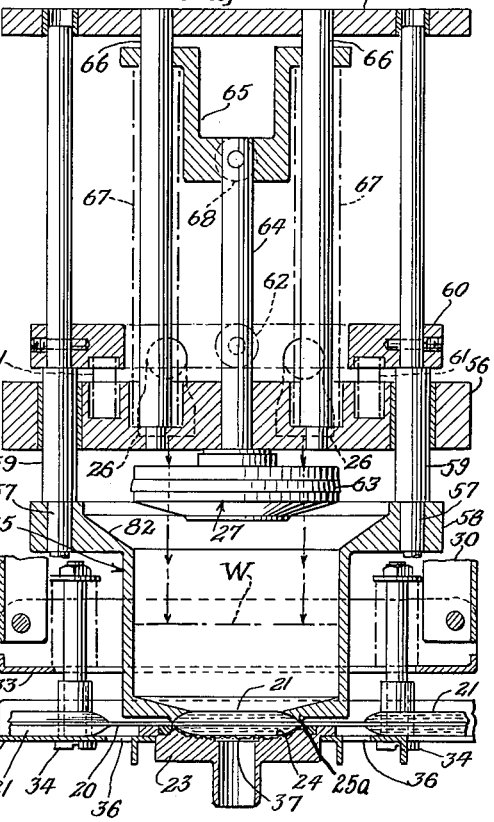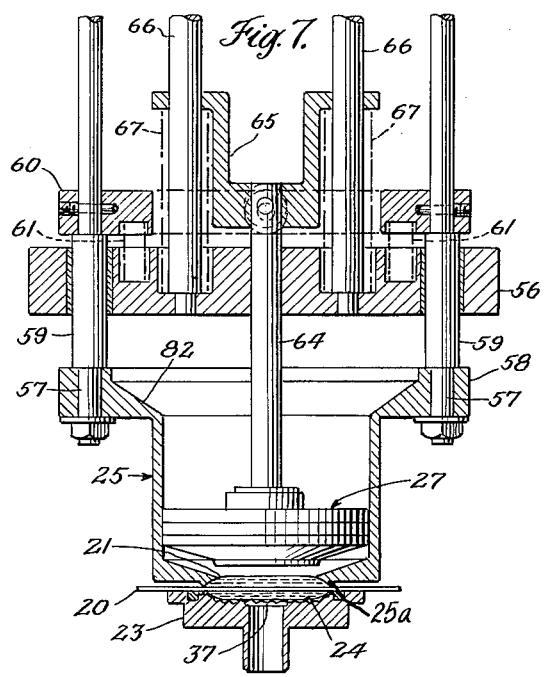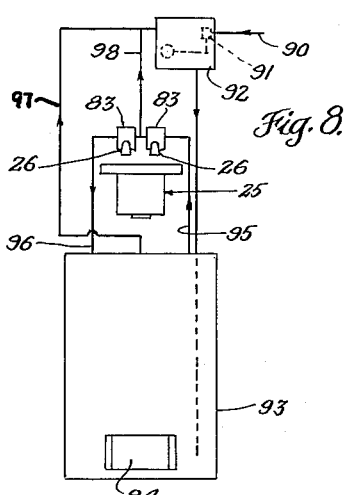

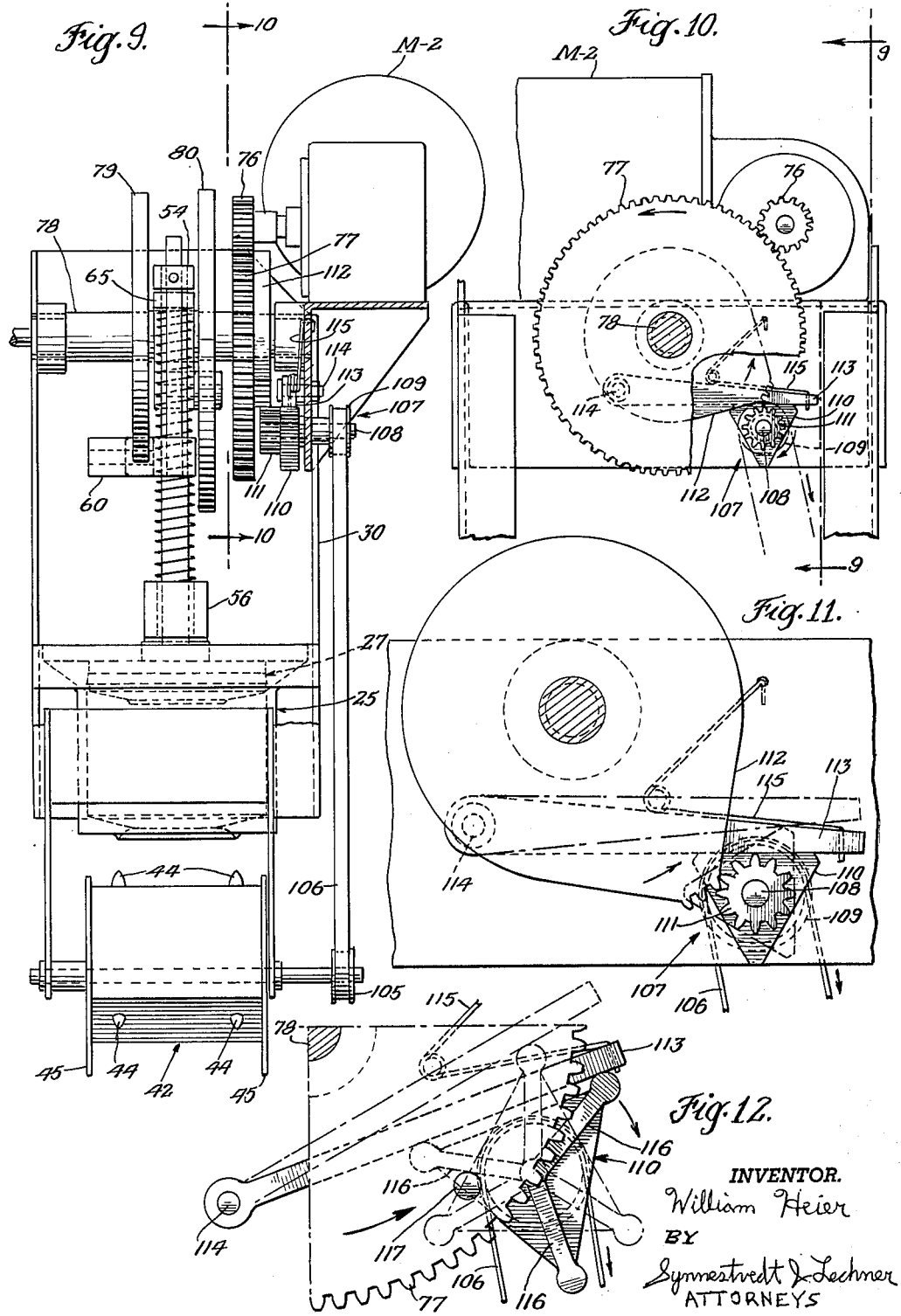

United States Patent Office 3,213,777
Patented Oct. 26, 1965

3,213,777
BREWING APPARATUS
William Heier, Warminster, Pa., assignor to Rudd-Melikian, Inc., Hatboro, Pa., a corporation of Pennsylvania
Filed May 31, 1963, Ser. No. 284,638
9 Claims. (Cl. 99—289)

This invention relates to apparatus for brewing hot liquid beverages from powdered solid material by passing hot water therethrough. The apparatus is especially useful in connection with the production of coffee, but it is also useful for making other types of beverages. One of the features of the invention is that it is especially adapted to brew a pre-selected volume of beverage, which volume may be a single cup or more than one cup.

While the brewers constructed according to the invention may be used under a wide variety of circumstances, they are especially suitable for use in automatic beverage vending equipment. The requirements for a brewer used in vending equipment are more strenuous than most, arising from the somewhat unusual conditions of use. For example, it is desirable that the vending machine brewer be capable of producing a single cup of fresh, good tasting coffee on demand, even though succeeding demands may occur at widely spaced or irregular intervals. In addition, inasmuch as the brewing apparatus in a vending machine is unattended, the brewer must be adapted for automatic operation, and should be constructed so that it is substantially free from tendencies to jam or otherwise fail. Stated differently, the brewer must have a high reliability.

One recent advance in the beverage brewing art, especially that portion which is concerned with automatic brewing, is in the introduction of paper tapes having spaced therealong cartridges or pods of powdered beverage material such as coffee. Brewers constructed according to the invention are especially useful in connection with such beverage tapes.

In accordance with one important aspect of the invention it is contemplated that a charge of coffee, whether encapsulated in a cartridge or not, is placed in a holder having a drain for conducting the brewed coffee away from the site of brewing. A brewing chamber is formed over the charge of coffee by bringing into position a cylinder. Following this operation, brewing liquid, such as hot water, is placed in the cylinder, and the brewing chamber is completed by inserting a piston into the cylinder to form the top of the chamber. The piston is progressively advanced into the cylinder to reduce the volume of the brewing chamber, and force the brewing liquid through the charge of coffee and out the drain.

It is an object of this invention to provide an automatic beverage brewing apparatus suitable for use in vending machines.

Another object of the invention is the provision of a brewing machine suitable for use with cartridge tapes of beverage material, including provision for a novel sequence in the handling of such tapes.

A further object of the invention is to provide a brewer utilizing a fairly low pressure source of brewing liquid.

It is an object of the invention to provide automatic brewing equipment which is simple in construction, reliable in operation, and substantially free from tendencies to jam.

Another object of the invention is the provision of a brewer adapted for use with beverage tapes having an improved mechanism for handling said tapes.

The above objects and purposes together with other objects and purposes may be more readily understood by a consideration of the detailed description of a preferred embodiment which follows together with the accompanying drawings in which:

FIGURE 2 is a sectional view taken approximately on the line 2—2 of FIGURE 1, with certain parts, including the cams and cam shaft omitted for clarity;

FIGURE 3 is a plan view of the equipment forming the lower portion of the brewer illustrated in FIGURE 1, including the cylinder and piston, the tape holding mechanism, and the tape. Other associated parts are omitted for purposes of clarity;

FIGURE 4 is a side elevational view looking toward the left in FIGURE 1, with some parts of the frame omitted in order to expose other parts of the apparatus in full view;

Figure 1:
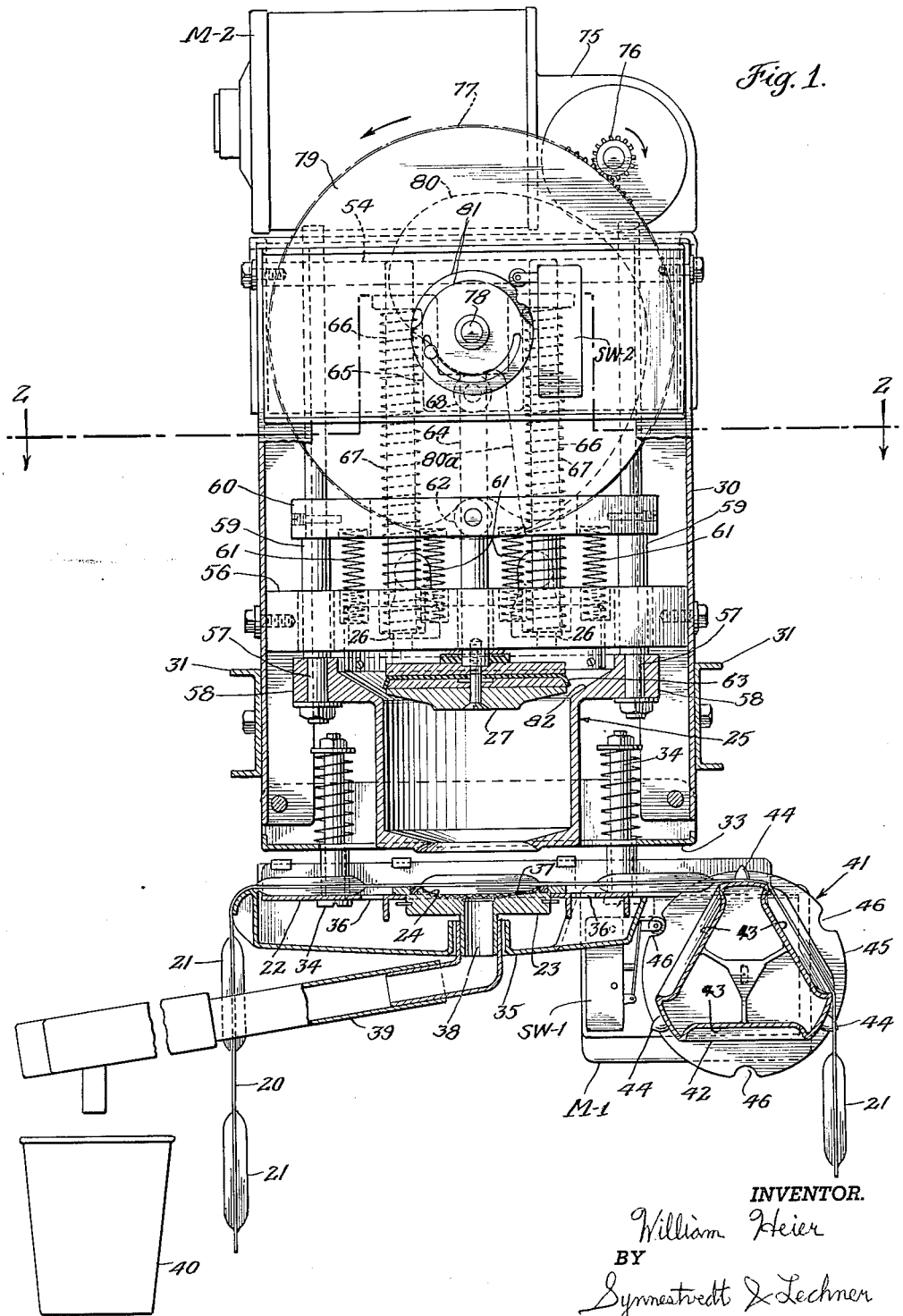
FIGURE 1 is in part an elevational view and in part a sectional view of a brewer constructed according to the invention, the section being taken as indicated by the line 1—1 on FIGURE 4.

FIGURES 5, 6, and 7 are sectional elevational views, showing successive stages in the brewing of a portion of coffee with the equipment shown in FIGURES 1 through 4;

FIGURE 8 is a diagrammatic view of a water supply system which may be used with the brewer;

FIGURE 9 is a side elevational view, as viewed in the direction of arrows 9—9 on FIGURE 10, similar to FIGURE 4, with certain parts omitted, and showing a different form of the indexing mechanism;

FIGURE 10 is a sectional view of a portion of the indexing mechanism, the section being taken on the line 10—10 of FIGURE 9;

FIGURE 11 is an enlarged fragmentary elevational view of the indexing mechanism, the view being similar to FIGURE 10 except that a different stage in the indexing operation is shown; and FIGURE 12 is a fragmentary enlarged elevational view similar to a portion of FIGURE 11, but showing a further modification of the indexing mechanism.

A brief general description of the equipment of the preferred embodiment, and its mode of operation, will be given for purposes of orientation before the various parts of the apparatus are discussed in detail.

Attention is first directed to FIGURES 5, 6, and 7. In those figures a beverage tape 20 is shown installed in the apparatus. The tape has beverage pods or cartridges 21 spaced therealong. In FIGURE 5 the right-hand most cartridge is marked with dotted lines, to indicate that it is wet, a portion of coffee having already been brewed from it.

The tape is positioned on a base plate 22 which carries a cartridge holder 23 having a cartridge cavity indicated at 24 therein. One of the pods is positioned in the cavity at the start of the brewing operation. A cylinder or brewing head 25 is mounted above the cartridge holder 23. As can be seen in FIGURE 5, the cylinder is initially spaced some distance above the cartridge holder and the tape. FIGURE 5 also shows that the cylinder has an open top and an opening in the bottom thereof. By means of mechanism which will be discussed later, the cylinder is moved downwardly into sealing engagement with the cartridge holder as shown in FIGURE 6. The pod or cartridge in the cartridge cavity is thus sealed inside the partially constructed brewing chamber, which at this point, consists of the pod holder and the cylinder. Brewing liquid, which is ordinarily hot water, is introduced into the cylinder by means of the outlets 26 which are positioned to discharge water into the open top of the cylinder as shown by the arrows in FIGURE 6. The water level is indicated diagrammatically in that figure by a dot and dash line marked W. The pod or cartridge in the brewing chamber is marked with dotted lines to indicate that it is now wet by the brewing liquid.

A piston 27 is mounted above the cartridge holder and the cylinder. The equipment to be discussed later is operated to move the piston into the cylinder as shown in FIGURE 7. This completes the brewing chamber by supplying a top thereto, and the further movement of the piston into the cylinder progressively reduces the volume of the brewing chamber and thus forces the hot water through the coffee pod and out the drain where it may be caught in a cup. The brewing chamber contains, in addition to the brewing liquid, a pocket of air between the liquid and the piston. The air cushion is desirable for several reasons. The compressed air escapes at the end of the brewing operation through the spent coffee pod, thus forcing all of the water out of the pod. In addition to improving the coffee brew, the removal of the last portion of water from the pod dries it somewhat, thus reducing the messiness of the spent portion of the tape.

Attention is now directed to FIGURES 1 through 4 from which an understanding of the structure of the preferred embodiment may be gained. As can be seen in FIGURES 1 and 4 the principal parts of the brewer are mounted on a box-like frame 30, which in turn is mounted on beam members 31 forming part of an open work frame 32 which may, for example, be incorporated into the structure of a vending machine cabinet. In FIGURE 2 it can be seen that the bottom plate 33 of the frame 30 has a central opening in it so that the cylinder 25 which is mounted within the box-like frame, may move downwardly toward the cartridge holder. The base plate 22 which carries the cartridge holder 23 is hung below the bottom plate 33 of the frame by means of four bolts 34. As can be seen in FIGURE 1, these bolts are spring loaded so that the base plate and the cartridge holder are normally urged upwardly toward the bottom plate 33 of the frame 30. It should be noted that the bolts are equipped with sleeves which serve to restrain the extent of the upward movement of the base plate 22.

The construction just mentioned is advantageous for reasons which can be understood by a brief reconsideration of FIGURES 5 and 6. From these figures it can be seen that when the cylinder 25 is brought down into sealing engagement with the cartridge holder 23, it is moved a distance such that the base plate 22 is urged downwardly somewhat against its spring mounting. Thus an assurance is provided that a sealing engagement between the cylinder and the cartridge holder will be accomplished despite the possibility of slight misalignment between the two parts, or change in dimensions of the parts caused by wear. It should be noted that, as shown in FIGURE 6, the bottom, or retaining ring portion 25a, of the cylinder 25 is configured to engage the cartridge holder 23 around the periphery of the cartridge cavity where a rubber-like sealing ring is mounted, and is also shaped to fit over and press upon the edge of a cartridge in the cavity, thus assuring that all of the brewing liquid passes through the cartridge without by-passing.

Returning now to FIGURE 1, it can be seen that the base plate 22 has a drip pan 35 with an outlet 35a (see FIGURE 4) mounted underneath it. Access to the drip pan is provided by openings 36 in the base plate 22 through which minor spillage may be drained off. The cartridge holder 23 is equipped with a screen 37 and a drain 38. Tubing 39 connects the drain of the cartridge holder with the serving station at which a cup 40 is positioned. The tubing should preferably be of a type which is unaffected by hot liquids such as coffee. Provisions of a kind known in the art can be made, if desired, to insert sugar and liquid or powdered cream in measured amounts into the tubing at some point along its length.

Also mounted on the base plate 22 is the indexing mechanism indicated generally at 41. It includes a triangular prism 42 mounted for rotation about its longitudinal axis with that axis oriented generally horizontally.

As can be seen best in FIGURE 1, the three rectangular surfaces or faces of the prism are provided with cartridge cavities 43, and indexing pins 44 are placed at the apexes of the angles formed by the sides of the prism. At the ends are mounted circular flanges 45 which are indented as at 46 to accommodate the roller on the arm of switch SW-1. The indexing mechanism is driven by motor M-1 which is shown in FIGURE 4. As can be seen in that figure the tape is provided with indexing means in the form of holes 55. The indexing means are spaced along the tape 20 so that a given set, for example the bottom pair in FIGURE 4, bears a predetermined relationship to the next two pods up-tape from the holes. The indexing pins 44 serve as index guides which are engageable with the indexing means 55. When the prism is oriented so that one set of indexing pins is upright, and engaged with a set of apertures in the tape, as shown in FIGURE 1, the construction just described assures that the second pod up-tape from the indexing pins is accurately positioned in the cavity of the cartridge holder 23.

When it is necessary to move a fresh pod into the cartridge cavity, and a spent one out, the motor M-1 is operated to rotate the prism in a clockwise direction as seen in FIGURE 1, to move the next set of indexing pins or guides into engagement with the next pair of indexing means on the tape, and then into an upright position. Thus the next cartridge will also be advanced to, and accurately positioned in, the cartridge cavity. The motor M-1 is started by operation of switch SW-2 at the top of the brewer, and is stopped with the indexing pins 44 in the proper position when the roller of switch SW-1 falls into a notch on the flange 45.

The box-like frame 30 has mounted within it the lower cross beam 56 which serves as a reaction point for several of the moving components of the brewer. The cylinder 25 is hung from the cross beam 56 in the following manner. Rods 57 are passed upwardly through holes in the flanges 58 which are located on either side of the cylinder at the top thereof. The rods in the region above the flanges 58 are enlarged in diameter as at 59. They are passed through holes in the cross beam 56, and are slideably fitted therein. The rods then pass through holes in a movable beam 60 to which they are attached as by pins or other conventional means. The rods continue upwardly to pass through holes in the upper cross beam 54. (See FIGURES 5 and 6 particularly.) As can be seen most clearly in FIGURE 2, the movable beam 60 is generally U-shaped in plan. Interposed between the movable beam 60 and the lower cross beam 56 are four compressible springs 61. Thus it can be seen that the cylinder is in effect spring mounted on the cross beam so that it can be moved downwardly against the force of the springs 61, and when a downward force is removed from the cylinder, the springs 61 will expand and raise the cylinder. The movable beam 60 carries a cam follower wheel 62 which rides on a power driven cam to be discussed later.

The piston 27 is built up of several layers, as shown in FIGURE 1. One of the layers is a gasket or sealing means 63. It is preferred that a construction similar to that shown in FIGURE 1 be used so that the gasket 63 may readily be replaced. The piston 27 is mounted on a piston rod 64 which passes through a hole in the lower cross beam 56. At its upper end the piston rod is attached to a movable piston operating beam 65. As can be seen from FIGURE 1, the movable beam is generally U-shaped in elevation. It is slideably mounted on two vertical rods 66 which project upwardly from lower beam 56 and are held at their tops by upper beam 54. Interposed between the movable beam 65, which carries the piston rod, and the lower cross beam 56, are a pair of compressible springs 67. Thus it can be seen that the piston is also suspended from lower cross beam 56 in a way such that it can be forced downwardly against its springs. When the downward force is released the springs will lift the piston to its upper position once again.

Cam follower wheel 68 is mounted on the movable beam 65 for engagement with a driven cam as will be discussed hereinbelow.

The driving mechanism for the brewing apparatus is mounted in the upper portion of the box-like frame 30. The construction of this mechanism can be understood by consideration of FIGURES 1 and 4. Power is supplied by motor M–2 which works through gear box 75 and driving pinion 76 to turn the large diameter gear 77. As the arrow indicates on FIGURE 1, the gear 77 rotates counterclockwise. The gear 77 is mounted on shaft 78 which carries on it two cams. The left-hand cam 79, in FIGURE 4, may be designated the cylinder cam, inasmuch as the cam follower wheel 62 which is interconnected with the cylinder 25, rides on the developed profile of this cam. From the shape of the cam as indicated in dotted lines in FIGURE 1, it can be seen that the cam will force the follower wheel, and hence the cylinder downwardly and hold it down for a dwell occupying by far the greater portion of the circumference of the cam. At the end of the dwell the cam will permit the follower wheel and the cylinder to rise upwardly under the influence of springs 61. The right-hand cam 80 in FIGURE 4 may be termed the piston cam. Cam follower wheel 68 rides on this cam, and it will be remembered that the follower 68 is connected with the piston 27. From the profile of the cam as shown in FIGURE 1, it can be seen that there is provided a fairly lengthy dwell in the upper position, followed by a gradual lowering of the piston as the cam rotates counterclockwise, followed by a rapid release of downward pressure occurring at line 80a which allows the springs 67 to urge the piston upwardly.

A pair of control switches are mounted in side-by-side relation on the outside of the upper part of the frame in a position so that the rollers of their switch arms can be seated in the indentation of the control discs 81 which are generally round, with switch operating indentations, and are mounted for rotation on the cam carrying shaft 78. These switches are designated SW–2 and SW–3. As mentioned above, operation of SW–2 initiates operation of the indexing motor M–1. It also stops brewer motor M–2, which is started by an external switch not shown, such as a switch associated with a coin mechanism.

Brewing liquid is supplied to the cylinder 25 at the appropriate time through the outlets 26 as can be seen most clearly in FIGURE 4. The outlets are mounted generally toward the rear of the box-like frame 30 and above the cylinder and piston, even when these parts are in their upper positions. The cylinder is preferably provided with a funnel top as shown at 82, and the outlets are so placed with respect to the funnel top that little or no water is lost in delivery from the outlets to the cylinder. Each outlet has a control valve 83 which is mounted on a bracket 84. The control valves are solenoid operated in a well known manner to open at a designated time, remain open for a preselected interval and then to close. The opening and closing of the valves is performed at the correct time in the operating cycle by switch SW–3.

A water supply system which is suitable for use with the brewer of the invention is shown diagrammatically in FIGURE 8. Water enters the system at 90 through float valve 91 in tank 92. From tank 92 it is conducted to heating tank 93 which contains an electrical heater 94. An output line 95 leads from the heater to the outlets 26. A return line 96 leads back to the heater and vent lines 97 and 98 lead from the water heater and the spigots respectively back to the tank 92.

It should be noted that the water system from the supply up to and including the outlets may be a fairly low pressure system, inasmuch as the supply pressure is not relied upon according to the invention to force the water through the coffee.

With the above description of the structure of the brewing mechanism in hand, attention is once again directed to FIGURES 5, 6 and 7 where several features omitted in the first discussion of these figures can now be pointed out. A comparison of FIGURES 5 and 6 will make clear the manner in which the movable beam 60 is forced downwardly toward the lower cross beam 56. These figures also illustrate the compression of the springs 61 during the lowering of the cylinder.

A comparison of FIGURES 6 and 7 will show the desirability of the U-shaped configuration of the movable beam 60. FIGURES 6 and 7 are vertical sections taken on a line such that only the legs of the U-shaped beam 60 appear. The rods 66 on which the movable beam 65 slides pass through the gap between the two legs. The piston rod 64 is also positioned in this gap. When the piston is in its lower position and accordingly the movable beam 65 is also in its lower position, the beam 65 is also positioned in the gap between the two legs of the U.

In FIGURE 6 it should be noted that the charge of water placed in the cylinder 25 does not completely fill the cylinder. When the piston 27 is moved from outside the cylinder, to within the cylinder, a certain amount of air is trapped between the lower face of the piston and the water. The air cushion so formed presents several advantages which have been discussed earlier. In FIGURE 7 it should be noted that the piston when it is at the bottom of its stroke is positioned in the cylinder a little distance short of the cartridge. This serves to prevent mutilation or damage to the spent cartridge which still forms a structural element of the tape. At the same time the air cushion effect assures that all of the water is forced through the cartridge, even though the piston does not move all the way to the bottom of the cylinder.

While the equipment of the present invention may be used with various sequences of operation, especially in the matter of handling the tape, the sequence of operation described below is to be preferred.

It is preferred that at the start of a brewing operation a fresh pod be located in the cavity of the cartridge holder 23. The brewing operation as illustrated in FIGURES 5, 6, and 7, is then performed after which the cylinder and piston are raised again to the position shown in FIGURE 5. Immediately after the restoration of the cylinder and piston to their starting positions, the indexing mechanism is operated to move the spent cartridge out of the cavity and to bring the next fresh cartridge into position. This system of cartridge handling presents several advantages in vending machine type operations where the time between successive demands for a portion of coffee may vary from a few seconds to ten or twelve hours. The wet, spent coffee pods are somewhat sticky, and experience has shown that there is a tendency for the pod to stick somewhat, as it dries out, in the cavity 24 of the cartridge holder if it is allowed to remain there for relatively long periods. The system outlined above overcomes this problem by moving the wet, spent cartridge out of the cavity immediately following the brewing. The advantages so obtained are of particular value in unattended vending machine brewers.

Attention is now directed to FIGURES 9 through 12 in which some modifications of the indexing mechanism are shown. It will be remembered that in the embodiment shown in the earlier figures a separate motor was provided for operating the indexing mechanism and that the motor M–2 was relied on only to operate the brewer. FIGURES 9 through 12 illustrate a modification in which the separate indexing motor is eliminated, and use is made of the brewer motor to operate the indexing equipment.

It should be emphasized that reasonable precision in indexing is important in a brewer of this kind, because a misalignment of the cartridge positioned in the cavity of the cartridge holder can cause an imperfect seating of the cylinder on the cartridge holder. Thus the unit will leak when the water is introduced or when the piston applies pressure to the water. Therefore it is necessary that the indexing guides or pins which engage and move the tape, are started and stopped with some precision. In particular, there is a requirement for angular precision since the pins are mounted for rotation.

The prism which carries the indexing pins in the embodiment shown in the drawings is three sided, and thus the prism must be rotated 120° during each indexing operation. If prisms with more sides are used, a correspondingly smaller number of degrees of rotation will be required.

In FIGURE 9 it can be seen that the brewer is substantially similar to the unit shown in FIGURE 4, and that the indexing prism 42 is also substantially the same. Motor M–1 has been removed, and a pulley 105 and belt 106 connect the prism 42 with the transmission designated generally at 107. The transmission 107 serves to complete the connection of the prism with motor M–2 at the top of the brewer. In FIGURE 9 it can be seen that a shaft 108 is mounted on the box-like frame 30. On the shaft are mounted a belt carrying pulley 109, a triangular locator element 110, and pinion 111. Shaft 78 at the top of the brewer carries an additional rotating member in the form of mutilated a gear 112. As can be seen in FIGURES 10 and 11, the mutilated gear 112 is engageable with the pinion 111. A biased locator bar 113 is pivotally mounted at 114 on the box-like frame. The bottom surface of the bar, toward the free end thereof, is positioned to rest on locator element 110. This can be seen in FIGURES 9, 10 and 11. The bar 113 is equipped witht a spring 115 which biases the bar toward the locator element. The number of teeth on the pinion 111 and the number of teeth on the mutilated gear 112 are preferably selected so that when the mutilated gear has been moved into and out of engagement with the pinion, it will have rotated the pinion a number of degrees which is more than half of the number of degrees the prism 42 must be rotated, but less than the total number of degrees the prism must be rotated. To illustrate, the mutilated gear shown in the drawings will rotate the pinion about 120°, and as was discussed earlier, the prism must be rotated exactly 120°. From the drawings it can be understood that the mutilated gear will engage the pinion once during a brewing cycle, and from the discussion above, it can be understood that it is preferred that the mutilated gear be so positioned on shaft 78 that the engagement with the pinion occurs immediately following the completion of a brewing cycle.

FIGURE 11 shows the mutilated gear just coming into engagement with the pinion 111. As the pinion rotates the locator element 110 will also rotate. In FIGURE 11, the position of element 110 at the beginning of a cycle is shown in full lines, while its position part way through the cycle is shown in dotted lines. The rotation of locator element 110 causes locator bar 113 to be forced upwardly against its biasing spring 115 as shown by the dot and dash lines on FIGURE 11. After the mutilated gear has moved out of engagement with the pinion, the locator element 110 is free to rotate and is urged to do so by the downward pressure exerted by bar 113. The triangular locator element thus rotates until a stable position has been reached with the bottom edge of the bar lying parallel to one side of the triangle, as shown in FIGURE 10. The locator plate 110 has thus been rotated through 120°, and as a consequence the pulley 109, the pulley 105, and the indexing prism 42 have also been rotated through 120°. In this position the pressure of the bias bar 113 against the flat face of the triangular locator 110 acts to yieldingly lock the locator and indexing prism 42 in accurately indexed position.

The above operation can be described somewhat more generally. The system comprising the locator element 110 which is, in general terms, a polygon mounted for rotation, and the bias bar 113, which is pivotally mounted on an axis parallel to the axis of rotation, of the element 110, has a number of stable positions of engagement equal to the number of sides of the polygon. Thus the polygon has a number of stable *angular* positions equal to the number of its sides, and the positions are spaced apart angularly a number of degrees equal to 360 divided by the number of sides of the polygon.

In FIGURE 12 is shown another embodiment of an indexing device according to the invention. In this embodiment the locator element 110 is provided with ribs 116 which are spaced apart 120°. The bar 113 is again pivotally mounted at 114. The bar and locator element are shown in their stable position in full lines and it should be noted that the stable position shown here does not involve horizontal alignment of the bar 113. In this arrangement a mutilated gear is not employed. However, a stud 117 is mounted on large diameter gear 77. Once during each rotation of gear 77, the stud 117 will engage a rib 116 of the locator element to turn the locator element the greater part of 120°. Following disengagement of the stud and rib, the biased bar 113 will complete the rotation and insure that the correct number of degrees of rotation have been accomplished.

It will be seen that the arrangement of FIGURE 12 functions in the same general manner as the arrangement of FIGURES 9 to 11, particularly with respect to the action of the polygonal locator. This is true, notwithstanding the fact that in FIGURE 12 the biased bar 113 contacts only the rib parts 116 of the locator structure, rather than the side faces thereof, as in the embodiment of FIGURES 9 to 11. Indeed, in the arrangement of FIGURE 12, the polygonal body of the locator element is not essentially present so long as the ribs 116 are present, such ribs in effect comprising a star wheel defining the corners of a polygon.

From the foregoing, it can be seen that there is provided by the present invention a brewing apparatus which is simple in construction and operation and thus capable of high reliability performance which is required in applications such as vending machines.

I claim:

1. A brewer for sequentially brewing portions of a beverage from material packaged in a cartridge tape having cartridges spaced therealong, each holding material for such a portion, said tape having indexing means spaced therealong in preselected positions with respect to said cartridges, comprising a cartridge brewing station having a cartridge holder and a beverage outlet, an open topped vertically oriented cylinder movably mounted above said brewing station, means for reciprocating said cylinder into and out of sealing engagement with said cartridge station, a brewing liquid dispenser mounted above said cylinder having a discharge opening positioned to discharge brewing liquid into the open top of said cylinder, a piston reciprocably mounted above said cylinder and proportioned to slidingly fit therein, means for reciprocating said piston into said cylinder when it is sealingly engaged with said cartridge station, and means cooperating with the indexing means on said tape to position a cartridge at said cartridge brewing station.

2. A brewer for sequentially brewing portions of a beverage from material packaged in a cartridge tape having cartridges spaced therealong, comprising, a vertically oriented open topped cylinder, a cartridge receiving housing having a cartridge cavity and a beverage outlet therein, said cylinder and housing being relatively movable between a position of engagement wherein they form the sides and bottom respectively of a cartridge containing brewing chamber, and a position of separation, a brewing liquid dispenser mounted above said cylinder having a discharge opening positioned to discharge brewing liquid into the open top of said cylinder, a piston proportioned to slidingly interfit in said cylinder to form the top of said brewing chamber, said piston being mounted for reciprocation between a position outside said cylinder and a position within said cylinder, whereby to complete the formation of said brewing chamber and to progressively reduce the volume thereof after brewing liquid has been inserted therein.

3. A brewer for sequentially brewing portions of a beverage from charges of beverage material comprising a frame, a beverage material holder mounted for limited vertical movement on said frame, said beverage material holder having a beverage material cavity and a beverage outlet therein, biasing means interposed between said frame and said holder for normally urging the holder upwardly on the frame, a brewing head movably mounted on said frame above said holder, said brewing head being engageable with said holder around the periphery of its beverage material cavity, and means mounting said head on said frame providing for generally vertical movement thereof between a position of sealing engagement with said holder wherein the holder is forced downwardly against its biasing means by the head, and a position of disengagement with said holder.

4. A brewer for sequentially brewing portions of a beverage from material packaged in a cartridge tape having cartridges spaced therealong comprising an open ended cylinder, a cartridge receiving housing having a cartridge cavity and a beverage outlet therein, said cylinder and housing being relatively movable between a position of engagement wherein they form the sides and end respectively of a cartridge containing brewing chamber, and a position of separation, a brewing liquid dispenser having means for discharging brewing liquid into the cylinder, a piston proportioned to slidingly interfit in said cylinder and adapted to form the other end of said brewing chamber, said piston being mounted for reciprocation between a position outside said cylinder and a position within said cylinder, whereby to complete the formation of said brewing chamber and to progressively reduce the volume thereof after brewing liquid has been inserted therein.

5. A brewer for sequentially brewing portions of a beverage from material packaged in a cartridge tape having cartridges spaced therealong, each holding material for such a portion, said tape having indexing means spaced therealong in preselected positions with respect to said cartridges, comprising a cartridge brewing station having a cartridge holder and a beverage outlet, and mechanism for intermittently moving a cartridge tape with respect to the brewing station and for indexing individual cartridges in said brewing station, the indexing mechanism including indexing guides movable to a position with relation to said brewing station corresponding to the position of said indexing means with relation to said cartridges, said guides being engageable with said indexing means to advance and index a cartridge in brewing position in the brewing station by moving to said position, and the indexing mechanism further including a polygonal locator element mounted for rotation, means for rotating said element through an angular range less than 360° divided by the number of sides of the polygonal locator, and a bias bar cooperating with said locator to effect completion of each increment of movement of the locator.

6. A construction according to claim 5 in which the bias bar is pivotally mounted on an axis paralleling the axis of rotation of the locator.

7. A construction according to claim 5 in which the bias bar is mounted to seat against a side of the polygonal locator.

8. A construction according to claim 5 in which the rotating means for the locator comprises a mutilated gear.

9. A construction according to claim 5 in which the number of indexing guides is the same as the number of sides of the polygonal locator and in which said indexing guides are mounted for rotation and are equally angularly spaced from each other about the axis of rotation.

References Cited by the Examiner

UNITED STATES PATENTS

| 1,754,146 | 4/30 | Calvino. |
| 2,529,395 | 11/50 | Hummel. |
| 2,862,240 | 12/58 | Strauss. |
| 3,019,719 | 2/62 | Parraga _____ 99—287 |
| 3,095,800 | 7/63 | Gilbert. |
| 3,143,954 | 8/64 | Nesmith _____ 99—289 |

FOREIGN PATENTS

| 1,238,694 | 7/60 | France. |
| 728,017 | 4/55 | Great Britain. |

WALTER A. SCHEEL, *Primary Examiner.*

LEONARD W. VARNER, JEROME SCHNALL, ROBERT E. PULFREY, *Examiners.*